(12) United States Patent
Spear

(10) Patent No.: US 11,558,760 B2
(45) Date of Patent: *Jan. 17, 2023

(54) PROTECTION SWITCHING USING PERFORMANCE METRICS

(71) Applicant: Accedian Networks Inc., Saint-Laurent (CA)

(72) Inventor: Greg Spear, Dorval (CA)

(73) Assignee: Accedian Networks Inc., Saint-Laurent (CA)

( * ) Notice: Subject to any disclaimer, the term of this patent is extended or adjusted under 35 U.S.C. 154(b) by 156 days.

This patent is subject to a terminal disclaimer.

(21) Appl. No.: 16/816,978

(22) Filed: Mar. 12, 2020

(65) Prior Publication Data

US 2020/0213881 A1 Jul. 2, 2020

Related U.S. Application Data

(63) Continuation of application No. 15/654,871, filed on Jul. 20, 2017, now Pat. No. 10,631,180, which is a continuation of application No. 14/712,593, filed on May 14, 2015, now abandoned.

(51) Int. Cl.
*H04W 24/04* (2009.01)
*H04L 43/0829* (2022.01)
*H04L 43/0852* (2022.01)
*H04L 45/00* (2022.01)
*H04L 43/16* (2022.01)
*H04L 41/0668* (2022.01)
*H04L 45/28* (2022.01)

(52) U.S. Cl.
CPC ......... *H04W 24/04* (2013.01); *H04L 41/0668* (2013.01); *H04L 43/0835* (2013.01); *H04L 43/0858* (2013.01); *H04L 43/16* (2013.01); *H04L 45/22* (2013.01); *H04L 45/28* (2013.01)

(58) Field of Classification Search
CPC ............... H04W 24/04; H04L 43/0835; H04L 43/0858; H04L 45/22; H04L 43/16; H04L 41/0668; H04L 45/28
See application file for complete search history.

(56) References Cited

U.S. PATENT DOCUMENTS

| | | | | |
|---|---|---|---|---|
| 9,780,964 B1 * | 10/2017 | Salam | ...................... | H04L 43/10 |
| 2013/0054784 A1 * | 2/2013 | Yadav | ...................... | H04L 43/08 |
| | | | | 709/224 |
| 2014/0355447 A1 * | 12/2014 | Gohite | .................. | H04L 45/125 |
| | | | | 370/236 |

\* cited by examiner

*Primary Examiner* — Eric Myers
(74) *Attorney, Agent, or Firm* — Stratford Group Ltd.

(57) ABSTRACT

Technology disclosed herein includes a method to trigger protection switching on a wireless link of a network device comprised in a protection switching capable network. The method comprises monitoring one or more performance metrics on said link and sending a signal failed message when at least one metric of said one or more performance metrics fails to satisfy performance criteria related to the at least one metric of said one or more performance metrics.

14 Claims, 3 Drawing Sheets

PROTECTION SWITCHING USING PERFORMANCE METRICS

CROSS REFERENCE TO RELATED APPLICATIONS

This application is a continuation of U.S. patent application Ser. No. 15/654,871, filed Jul. 20, 2017, now allowed, which is a continuation of and claims priority to U.S. patent application Ser. No. 14/712,593 entitled "Protection Switching Using Performance Metrics" and filed on May 14, 2015, now abandoned, which is hereby incorporated by reference in its entirety.

FIELD OF THE INVENTION

The present disclosure relates to protection switching in networks specifically to Ethernet protection switching.

BRIEF SUMMARY

Technology disclosed herein includes a method to trigger protection switching on a wireless link of a network device comprised in a protection switching capable network. The method comprises monitoring one or more performance metrics on said link and sending a signal failed message when at least one metric of said one or more performance metrics fails to satisfy performance criteria related to the at least one metric of said one or more performance metrics The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1A:
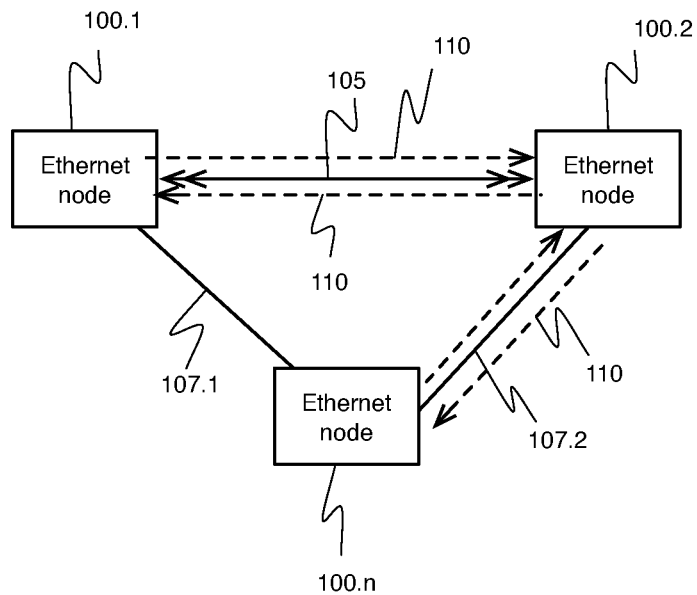
FIG. 1a is an example of a ring network.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

BACKGROUND

Networks are commonly designed with protection switching capabilities. The protection switching mechanism is standardized (e.g. ITU-T G.8032). The active links are monitored and when a link fails the node sends a signal failed (SF) message and the traffic is routed to an alternative link. Another approach to trigger protection switching is to periodically send continuity checks (CC) messages consecutively on the active link. The node at the other end monitors the reception of the CC messages and if more than a predetermined number of consecutive CC messages are not received the link is deemed to have failed and protection switching is triggered so the traffic is routed to the alternate link. In the current standards, protection switching is only triggered when a link has failed.

DETAILED DESCRIPTION

Figure 1B:
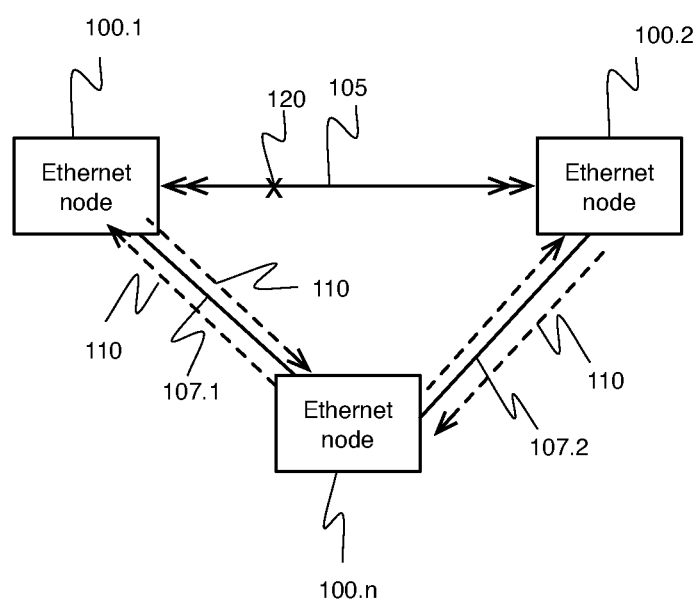
FIG. 1b is an example of a ring network.

FIG. 1a shows an example of a ring network comprising three Ethernet nodes 100.1, 100.2, 100.3. The Ethernet nodes 100.1, 100.2, 100.3 are coupled by wired 105 or wireless links 107.1, 107.2. The arrows 110 show an example of the direction of the traffic. FIG. 1b shows the same example ring network with a failed link 120 and the change in traffic direction after the protection switching has occurred.

Figure 2:
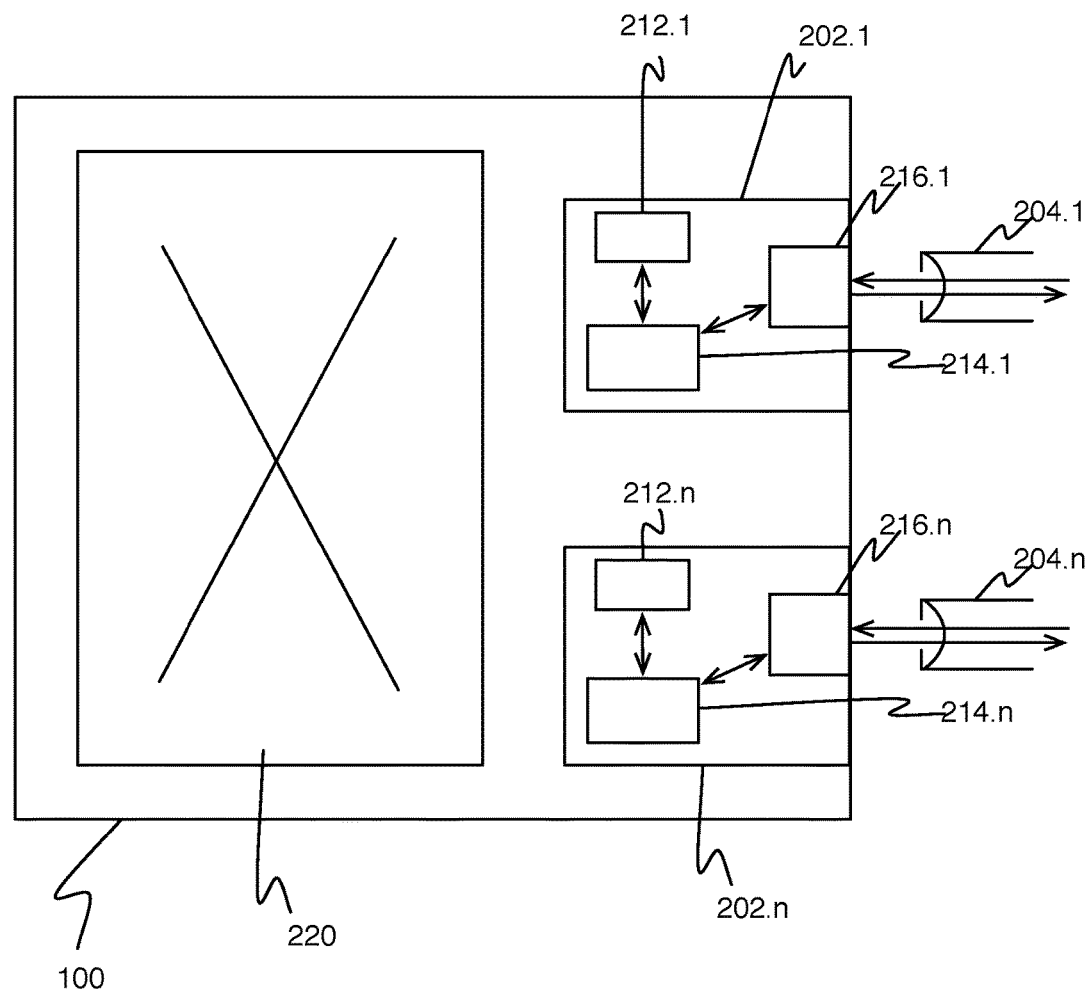
FIG. 2 is an example of an Ethernet node.

FIG. 2 depicts a generic Ethernet node 100 supporting n links 204.1 . . . 204.n, either wired or wireless. The links terminate on a port 202.1 . . . 202.n on the node. The node 100, comprises one or more switching element 220 coupled with the ports. A port 202.1 . . . 202.n generally comprises a receiver/transceiver module 216.1 . . . 216.n, a processor 214.1 . . . 214.n and may comprise a performance management module 212.1 . . . 212.n which executes on the processor. In other architecture, a performance management module may be centralized in the node.

The performance management (PM) module maintains different performance metrics on the performance of the link as well known in the art. Examples of performance metrics include packet loss, delay, delay variation, errored packets etc. These are measured periodically and different types of statistics are maintained on each performance metrics. Typically the performance metrics are sent regularly to a management system.

Protection switching capable networks can be implemented with one or more wireless link. The bandwidth and quality of a wireless link can vary with time based on several conditions (e.g. weather). The variation in bandwidth and quality may be gradual or rapid but can be significant. In one embodiment, the PM module associated with a wireless link implements further logic to trigger protection switching by declaring a SF when one or more performance metrics fall outside of a predetermined range, even though the link as not failed.

Figure 3:
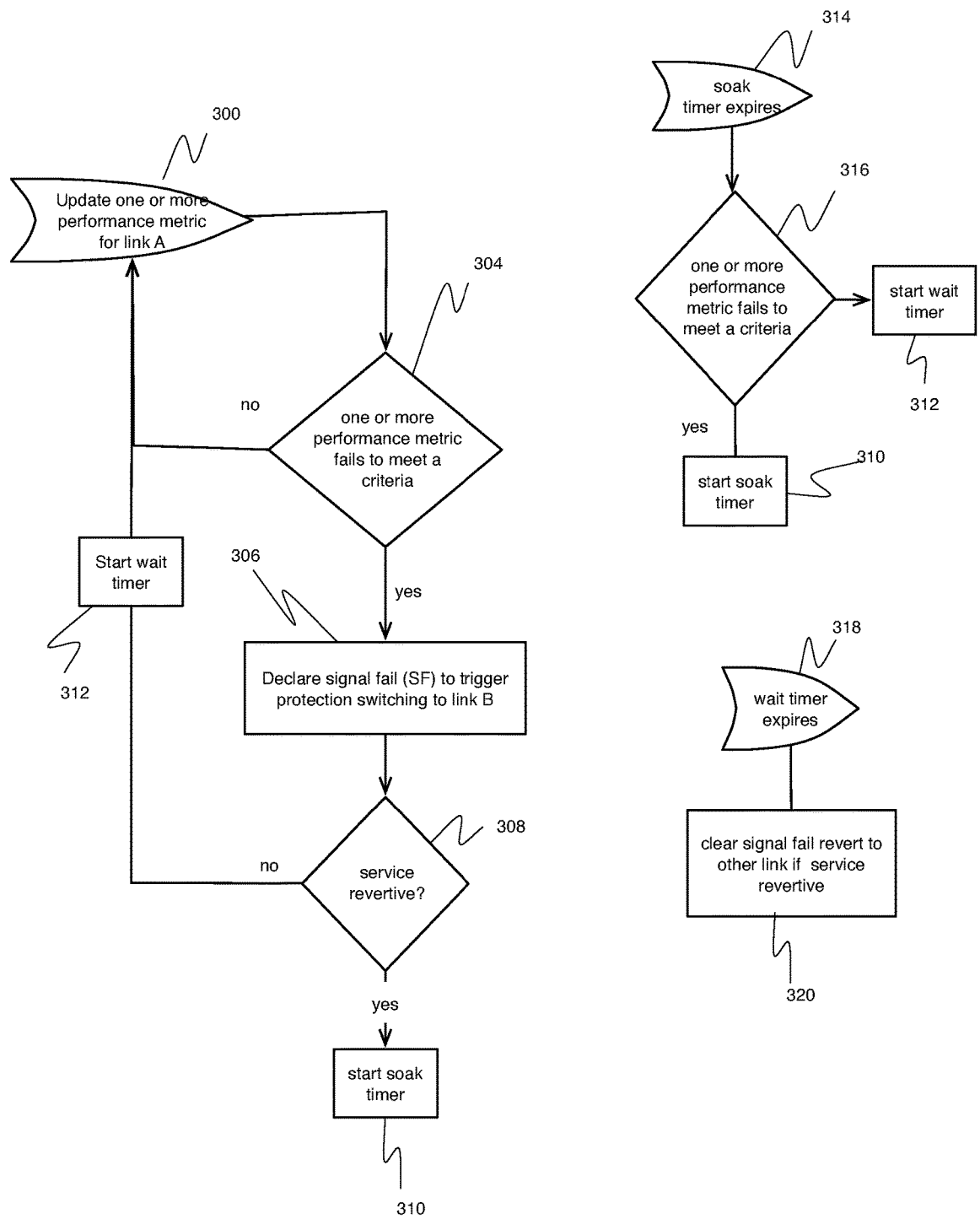
FIG. 3 is an example flow chart of an embodiment that triggers protection switching based on performance metrics.

FIG. 3 shows an example of the embodiment implemented by the PM module that would be executed by a processor. Periodically, PM module updates one or more performance metrics 300 relating to link A. If one or more of the performance metrics fails to satisfy a predetermined performance criteria 304, then a SF is sent to trigger a protection switching event to link B 306. If the service is configured as revertive 308, then a soak timer is set to a predetermined value 310. Otherwise a wait timer is set to a predetermined value 312.

When the soak timer expires, if there are no performance metrics fail to satisfy a predetermined performance criteria 316, then the wait timer is set to a predetermined value 312. Otherwise the soak timer is reset to a predetermined value 310.

When the wait timer expires 318, the SF is cleared for link A 320. If the service is revertive, the traffic is rerouted back to link A, otherwise link A remains idle and is now available to be used for protection switching event.

For example, the PM module maintains a packet loss ratio, which is based on the number of loss events measured in a predetermined window of elapsed time. Any methods for calculating a packet loss ratio, known in the art can be used (e.g. weighted average, moving window etc). When the packet loss ratio exceeds a predetermined value, for example, 75%, the performance metric is deemed to have failed to satisfy a performance criteria. The PM module sends a SF message to trigger protection switching to an alternate link as per the standard.

The standard link fail detection method can also be used in conjunction with the above embodiment.

Optionally, at the same time, the port may stop to respond to CC messages to further trigger protection switching.

Several different performance metrics can be monitored by the PM module and protection switching to an alternate link, via a SF message or non response to CC message, can be triggered by a combination of the performance metrics failing a criteria. For example, the SF message is triggered if the average delay exceeds a predetermined delay threshold and the packet loss exceeds a predetermined loss threshold.

The combined trigger can be also combined with the single performance metric trigger described above. In this case, for example, a SF message is sent if the average delay is greater than 200 msec AND the loss is greater than 65%, OR if the packet loss alone is greater than 75% regardless of the average delay.

As discussed above, the performance metrics can be computed and maintained using methods well known in the art. As another embodiment, performance metrics can be maintained on a per service or per type of packet basis (e.g. video, data). In this case, protection switching can be triggered when the performance metrics of one service fails a criteria, while the performance metrics of another service still meets a criteria. In general, when protection switching is triggered, all traffic is moved to an alternate link.

Hysteresis can also be applied to the thresholds as known in the art.

Using this embodiment, protection switching can be performed on a degrading wireless link before it completely fails.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method to trigger protection switching on a network device, comprising:
   monitoring two or more performance metrics on a first link in said network device;
   sending a signal failed message when a combined expression is true, the combined expression comprising at least one of said two or more performance metrics being evaluated both alone against a first predetermined threshold and against a second predetermined threshold different from the first predetermined threshold in combination with another performance metric of said two or more performance metrics being evaluated against a third predetermined threshold;
   triggering a protection switching event from said first link to a second link in said network device in response to said signal failed message;
   monitoring the two or more performance metrics on said first link; and
   clearing, after waiting at least once for a predetermined time value, the protection switching event when the combined expression is no longer true.

2. The method of claim 1 further comprising monitoring a link status of said first link and sending the signal failed message when the link status is failed.

3. The method of claim 1 wherein the two or more performance metrics comprises average delay.

4. The method of claim 1 wherein the two or more performance metrics comprises packet loss.

5. The method of claim 1 wherein said first link comprises an Ethernet link.

6. The method of claim 1 wherein clearing the protection switching event comprises returning network traffic to said first link.

7. The method of claim 1 wherein clearing the protection switching event comprises network traffic remaining on said second link.

8. A network device with two or more links coupled to a network comprising:
   a processor;
   one or more computer readable, non-transitory, tangible storage media;
   program instructions stored on the one or more computer readable storage media for triggering protection switching from a first link to a second link of the two or more links when a combined expression is true, the combined expression comprising at least one of two or more performance metrics being evaluated both alone against a first predetermined threshold and against a second predetermined threshold different from the first predetermined threshold in combination with another performance metric of said two or more performance metrics being evaluated against a third predetermined threshold;

monitoring the two or more performance metrics on said first link; and clearing, after waiting at least once for a predetermined time value, the protection switching event when the combined expression is no longer true.

9. The network device of claim 8 wherein the processor reads and executes the program instructions, wherein the program instructions further direct the processing system to monitor a link status and send the signal failed message when the link status is failed.

10. The network device of claim 8 wherein the two or more performance metrics comprises average delay.

11. The network device of claim 8 wherein the two or more performance metrics comprises packet loss.

12. The network device of claim 8 wherein the first link comprises an Ethernet link.

13. The network device of claim 8 wherein clearing the protection switching event comprises returning network traffic to said first link.

14. The network device of claim 8 wherein clearing the protection switching event comprises network traffic remaining on said second link.

\* \* \* \* \*